United States Patent [19]

Olson

[11] Patent Number: 4,613,056
[45] Date of Patent: Sep. 23, 1986

[54] SEED METER HAVING CLEANOUT AND SEED SEALING MEMBER

[75] Inventor: Jay H. Olson, Rock Island, Ill.
[73] Assignee: Deere & Company, Moline, Ill.
[21] Appl. No.: 546,829
[22] Filed: Oct. 31, 1983
[51] Int. Cl.[4] .............................................. B65H 3/08
[52] U.S. Cl. .................................. 221/211; 222/636; 111/34
[58] Field of Search ................................ 221/210-211, 221/277, 263, 265, 266, 185; 111/34, 91, 77; 222/148, 367, 630, 636

[56] References Cited

U.S. PATENT DOCUMENTS

| | | | |
|---|---|---|---|
| 2,991,909 | 7/1961 | Camazou et al. | 221/211 |
| 3,664,675 | 5/1972 | Malmstrom | 277/84 |
| 3,796,346 | 3/1974 | Ribouleau | 221/211 |
| 3,888,387 | 6/1975 | Deckler | 221/278 |
| 3,999,690 | 12/1976 | Deckler | 221/211 X |
| 4,162,744 | 7/1979 | Barker et al. | 221/251 |

FOREIGN PATENT DOCUMENTS

| | | | |
|---|---|---|---|
| 2323308 | 4/1977 | France | 221/211 |
| 802899 | 10/1958 | United Kingdom | 221/211 |
| 738536 | 6/1980 | U.S.S.R. | 111/34 |
| 865165 | 9/1981 | U.S.S.R. | 111/34 |

Primary Examiner—Joseph J. Rolla
Assistant Examiner—Michael S. Huppert
Attorney, Agent, or Firm—Fraser and Bogucki

[57] ABSTRACT

In a seed meter in which a seed disk having a circular outer edge is rotatably mounted on a hub within a generally cylindrical housing, an elongated cleanout and seed sealing member mounted within the housing adjacent a substantial portion of the circumference of the outer edge of the seed disk forms a generally uniform space or gap with the outer edge of the seed disk which is large enough to pass most seed chips, broken seeds, dirt and other debris therethrough but small enough to prevent seeds contained within the housing and adjacent the seed disk from escaping therethrough. The cleanout and seed sealing member has a sloped surface adjacent the outer edge of the seed disk which provides the space or gap with a size that increases with increasing distance from the axis of rotation of the seed disk to facilitate the escape of debris. The housing has a slot in the outer edge thereof adjacent the outer edge of the seed disk and the cleanout and seed sealing member which extends around a substantial portion of the circumference of the outer edge to facilitate elimination from the housing of debris which passes through the space or gap between the cleanout and seed sealing member and the outer edge of the seed disk. The seed disk has a plurality of spaced-apart cavities and intervening ribs at the outer edge thereof which facilitate the scraping and removal of debris from within the housing.

13 Claims, 7 Drawing Figures

SEED METER HAVING CLEANOUT AND SEED SEALING MEMBER

BACKGROUND OF THE INVENTION

1. Field of the Invention

The present invention relates to seed meters for metering seeds therefrom during a planting operation, and more particularly to seed meters of the type in which a mass of seeds is stored within a housing and adjacent a rotating seed disk for pickup and dispensing of individual seeds from the mass by the seed disk.

2. History of the Prior Art

It is known in the agricultural equipment field to provide seed meters for metering or dispensing individual seeds from a seed mass at a controlled rate during a planting operation. Many seed meters are of the air type in which a positive air flow or a vacuum is used to assist in holding the individual seeds in place on a rotatable or otherwise movable member for eventual discharge from the meter to a furrow in the ground below.

An example of a vacuum seed meter is provided by a co-pending application of Lundie et al, Ser. No. 546,834, filed Oct. 31, 1983 and commonly assigned with the present application. The vacuum seed meter described in the Lundie et al application has a seed disk rotatably mounted within a generally cylindrical housing so as to define a seed chamber on one side of the disk within the housing and a vacuum chamber on the other side of the disk and within the housing. A vacuum source coupled to the vacuum chamber creates a vacuum therein which communicates with a circumferential array of apertures in the seed disk extending through the thickness thereof to the bottoms of seed cells on the opposite side of the seed disk. As the seed disk rotates through a mass of seeds within the seed chamber, the seed cells in the disk agitate, accelerate and then capture therein individual seeds. As the cells rise above the seed mass with rotation of the seed disk, the vacuum within the vacuum chamber on the opposite side of the disk communicates through the apertures in the disk to hold the individual seeds in place within the seed cells. As the seed disk continues to rotate, the individual seed cells eventually reach a seed discharge area where the effects of the vacuum are cut off from the apertures, allowing the seeds to fall out of the seed cells with the effects of gravity. As the individual seeds fall out of the seed cells within the seed discharge area, the seeds fall down a chute at the bottom of the seed meter to the ground below.

In the vacuum seed meter described in the co-pending application of Lundie et al, as in the case of most seed meters, continued use of the meter causes dirt and other debris to accumulate within the meter. Part of such debris is comprised of broken seeds and seed chips or particles. Such debris interferes with the operation of the seed meter and therefore is desirably eliminated. While some of the debris is eliminated by being drawn through the seed cells and connecting apertures by the vacuum, debris still collects within the seed meter where it can build up and interfere with proper operation if not removed.

Prior seed meters have provided various arrangements for eliminating debris therefrom. For example, in U.S. Pat. No. 3,888,387 of Deckler a rotating member within a seed meter which picks up and carries seeds within pockets therein adjacent the outer edge thereof has a series of passageways at the outer edge to establish a pressure differential with the pockets. The passageways are also configured to have the effect of wiping an adjacent surface to prevent dust buildup and to purge chips or broken seeds from the pockets. In other examples of prior art seed meters, debris is expelled through a gap between a rotating seed member and a housing. Unfortunately, design of such gaps usually makes them rather ineffective. Moreover, the gap is usually fixed in size so as to provide the necessary seal for seeds of larger size but not for seeds of smaller size. Still other areas of the prior art as exemplified by U.S. Pat. No. 3,664,675 of Malmstrom teach that a rib member rotatable relative to and in contact with another member can provide a radially directed pumping effect. However, nothing in the art provides a solution to the problem of providing effective and reliable elimination of debris from seed meters of the type described in the previously referred to co-pending application of Lundie et al.

Accordingly, it would be desirable to provide a seed meter having an improved arrangement for eliminating debris therefrom. It would furthermore be desirable to provide a seed meter having an effective arrangement for eliminating debris therefrom which is useful with seeds of different sizes.

BRIEF DESCRIPTION OF THE INVENTION

Briefly, the present invention provides a seed meter having an improved and effective arrangement for eliminating seed chips, broken seeds, dirt and other debris from the inside of the meter. Such arrangement is useful and effective with seeds of various different sizes.

In a preferred arrangement for use in conjunction with a seed meter having a generally cylindrical housing with a seed disk rotatably mounted therein, a cleanout and seed sealing member of elongated configuration is mounted within the housing adjacent a portion of the circumference of a circular outer edge of the seed disk to form a gap of controlled size with the outer edge of the seed disk. The gap is smaller than seeds contained within the housing but large enough to pass most debris such as seed chips, broken seeds and dirt therethrough which does not escape through apertures in the seed disk and which would otherwise accumulate within the seed meter.

The cleanout and seed sealing member which preferably extends around the housing adjacent a substantial portion of the circumference of the outer edge of the seed disk has a generally uniform cross-sectional shape which is tapered so that a broad surface thereof extending along the length thereof adjacent the outer edge of the seed disk slopes gradually away from the outer edge of the seed disk with increasing distance outwardly from the axis of rotation of the seed disk. Accordingly, the gap between the cleanout and seed sealing member and the outer edge of the seed disk becomes larger with increasing distance outwardly from the axis of rotation of the seed disk, and this greatly aids in passing debris through the gap.

The outer edge of the seed disk is preferably provided with a series of spaced-apart cavities separated by and forming ribs therebetween. The ribs are operative to scrape the interface between the seed disk and the cleanout and seed sealing member, which has the effect of loosening and agitating debris thereat. The cavities aid in passing the debris through the gap between the disk and the cleanout and seed sealing member.

The housing which is generally cylindrical in configuration has a generally circular outer edge disposed outside of and adjacent the outer edge of the seed disk. The housing has a slot in the outer edge thereof which is disposed adjacent the cleanout and seed sealing member and the outer edge of the seed disk and which aids in dispensing debris passed through the gap between the cleanout and seed sealing member and the outer edge of the seed disk to the outside of the seed meter housing. The slot preferably extend around a substantial portion of the circumference of the circular outer edge of the housing.

The gap between the cleanout and seed sealing member and the outer edge of the seed disk is smaller than the seeds contained within the housing to prevent the seeds from escaping through the gap. At the same time the gap is large enough to pass most debris therethrough. If the seed meter is to be usable with different kinds of seeds, the size of the gap must be made variable to accommodate the different sizes of different types of seeds. Larger seeds allow the use of a relatively large gap, while smaller seeds require a correspondingly smaller gap. This is accomplished by use of a spacer on the side of the seed disk which is disposed in contact with a rotatably driven hub within the housing on which the seed disk is mounted. The thickness of the spacer determines the size of the gap between the cleanout and seed sealing member and the seed disk. The spacer may comprise a ring which extends outwardly from the side of the seed disk by a desired distance and which has a center thereof at the axis of rotation of the disk.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
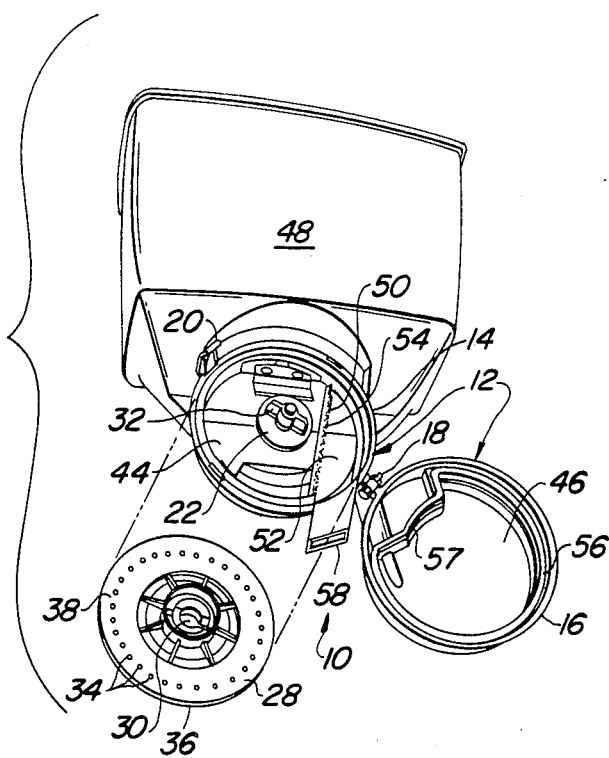
FIG. 1 is a perspective view of a seed meter having a cleanout and seed sealing member in accordance with the invention, the seed meter being shown in an open position together with a seed disk.

FIGS. 1-4 illustrate a vacuum seed meter 10 which has a generally cylindrical housing 12 comprised of a first half shell 14 and an opposite, mating second half shell 16. The second half shell 16 is coupled to the first half shell 14 by a hinge 18 permitting the second half shell 16 to be closed over the first half shell 14 to close the housing 12. A clasp 20 mounted on the first half shell 14 on a side thereof opposite the hinge 18 is secured to the second half shell 16 to hold the housing 12 in the closed position.

Figure 4:
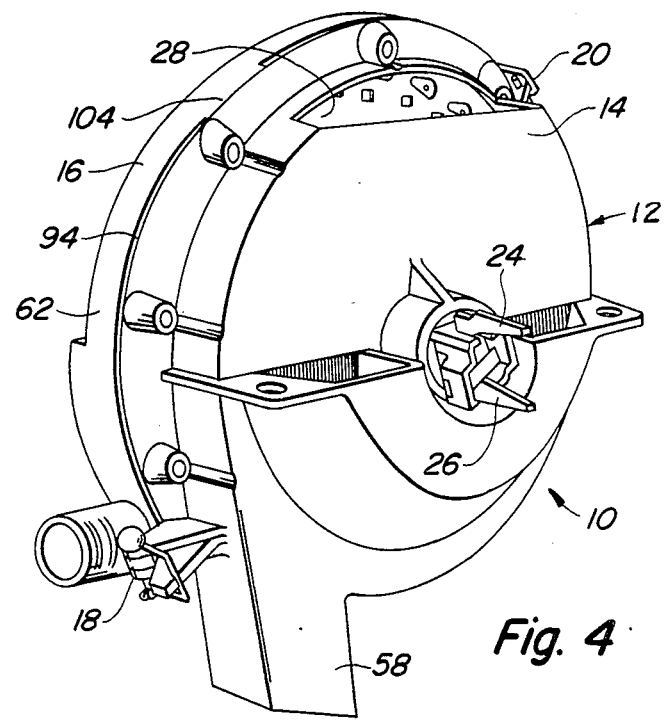
FIG. 4 is a left rear perspective view of the seed meter of FIG. 1 with the meter in the closed position.
Figure 3:
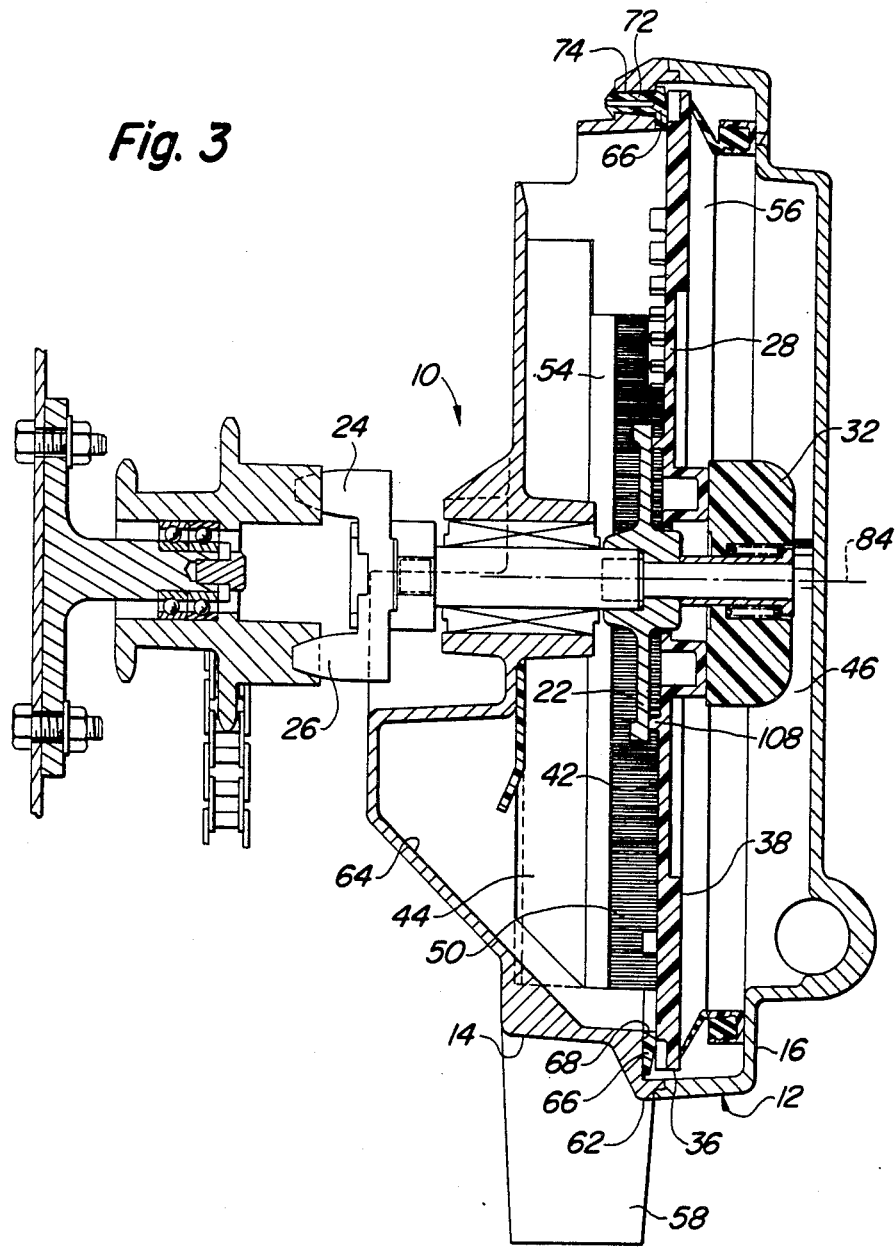
FIG. 3 is a sectional view of the seed meter of FIG. 1 with the meter in a closed position.

A hub 22 is rotatably mounted within the first half shell 14 of the housing 12 at the center of the first half shell 14. As seen in FIGS. 3 and 4 a pair of lugs 24 and 26 are disposed on the outside of the first half shell 14 at the back of the housing 12. The lugs 24 and 26 are engaged by a driving arrangement shown in FIG. 3 to rotatably drive the hub 22.

The seed meter 10 includes a seed disk 28 which has an elongated aperture 30 at the center thereof. The seed disk 28 is mounted for rotation on the hub 22 by passing a handle 32 which is mounted on the hub 22 through the elongated aperture 30 to seat the seed disk 28 on the hub 22. The handle 32 is then rotated into a position to lock the seed disk 28 on the hub 22. This arrangement for mounting the seed disk 28 on the hub 22 is described in greater detail in a co-pending application of Webber, Ser. No. 546,831, filed Oct. 31, 1983 and commonly assigned with the present application.

The seed disk 28 has a plurality of apertures 34 therein arranged in a circumferential array adjacent and inside of a circular outer edge 36 of the seed disk 28. Each of the apertures 34 extends through the thickness of the seed disk 28 between a first side 38 of the seed disk 28 and the bottom of one of a plurality of seed cells 40 formed in an opposite second side 42 of the seed disk 28.

With the seed disk 28 mounted on the hub 22 and the second half shell 16 closed over the first half shell 14, the seed disk 28 divides the hollow interior of the cylindrical housing 12 into a seed chamber 44 between the seed disk 28 and the first half shell 14 and a vacuum chamber 46 between the seed disk 28 and the second half shell 16. A vacuum source is coupled via a vacuum port 47 in the second half shell 16 to create a vacuum within the vacuum chamber 46 adjacent the first side 38 of the seed disk 28. The vacuum communicates with the seed cells 40 formed in the second side 42 of the seed disk 28 via the apertures 34.

As shown in FIG. 1 the first half shell 14 of the cylindrical housing 12 is mounted at the base of a seed hopper 48 for containing seeds to be metered by the vacuum seed meter 10. Seeds from the seed hopper 48 flow into the seed chamber 44 within the first half shell 14 where they form a seed mass against the second side 42 of the seed disk 28. As the hub 22 is rotatably driven so as to rotate the seed disk 28, the seed cells 40 agitate, accelerate and then capture individual seeds therein as they move through the seed mass within the seed chamber 44. As each seed cell 40 rises out of the seed mass, the seed contained therein is held in place by the vacuum within the vacuum chamber 46 which communicates with the seed via the aperture 34. The vacuum holds the seed in place in the seed cell 40 until the seed cell 40 passes across a divider brush 50. The divider brush 50 extends across the interior of the first half shell 14 and defines a seed discharge area 52 which is separated from the seed chamber 44 and the seed mass contained therein by the divider brush 50 and a divider wall 54 on which the brush 50 is mounted. As the seed cell 40 enters the seed discharge area 52, the effects of the vacuum from within the vacuum chamber 46 are cut off. This is due to the shape of a vacuum seal 56 which is mounted on the inside of the second half shell 16 and which extends into contact with the first side 38 of the seed disk 28. A portion 57 of the vacuum seal 56 extends inwardly from the region adjacent the circumference of the second half shell 16 to isolate the seed discharge area 52 from the vacuum. As the vacuum is cut off from the seed cell 40, the individual seeds contained therein fall out of the seed cell 40 under the influence of gravity. The seed falls through a seed discharge chute 58 at the bottom of the first half shell 14 to the ground below.

The vacuum seed meter 10 is shown and described in considerably greater detail in the previously referred to co-pending application of Lundie et al.

Referring to FIG. 3 the seeds from the seed hopper 48 shown in FIG. 1 form the seed mass within the lower part of the seed chamber 44. The seeds of the seed mass reside on an inner surface 60 of a generally circular outer edge 62 of the generally cylindrical housing 12. The seeds also reside against the second side 42 of the seed disk 28 as well as an opposite inner wall 64 within the first half shell 14. As the seed meter 10 is used, seed chips, broken seeds, dirt and other debris begin to form within the seed chamber 44. Most of such debris is drawn through the apertures 34 in the seed disk 28 by the vacuum in the vacuum chamber 46. Much of the remaining debris settles on the inner surface 60 at the second side 42 of the seed disk 28.

Figure 2:
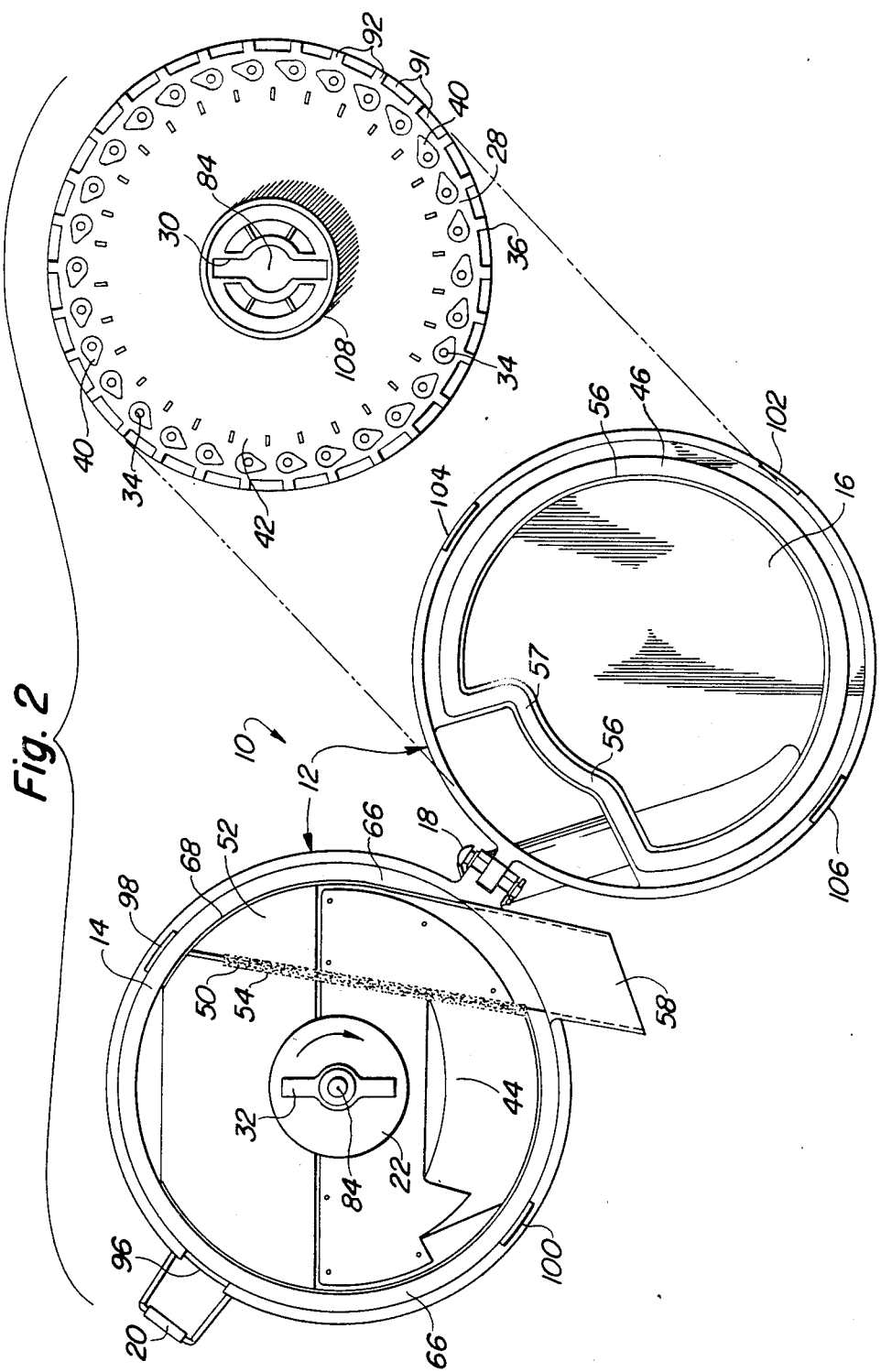
FIG. 2 is a plan view of the seed meter of FIG. 1 with the meter in the open position and showing the reverse side of the seed disk.

In accordance with the invention the debris which settles within the seed chamber 44 is eliminated by an arrangement which includes a cleanout and seed sealing member 66. The cleanout and seed sealing member 66 is mounted on a flat surface 68 of circular configuration within the first half shell 14 adjacent the inner surface 60. As seen in FIGS. 1 and 2 the cleanout and seed sealing member 66 is of elongated configuration so as to extend around a substantial portion of the circumference of the outer edge 62 of the housing 12. The cleanout and seed sealing member 66 is interrupted only by the seed discharge chute 58 at the bottom of the seed discharge area 52.

Figure 5:
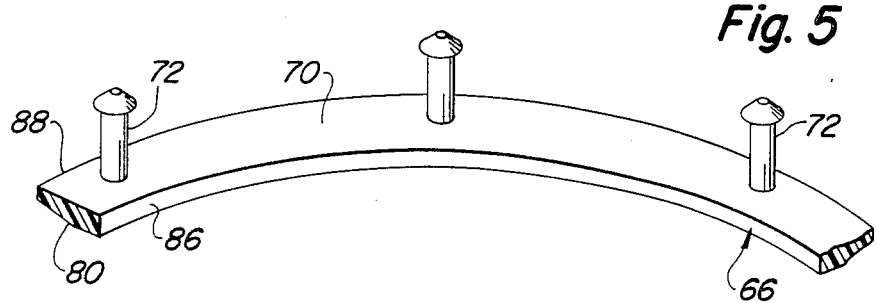
FIG. 5 is a perspective view of a portion of the cleanout and seed sealing member showing two of the mounting posts which are formed thereon.

As shown in FIG. 5 the cleanout and seed sealing member 66 has a relatively flat bottom surface 70 extending along the length thereof and having a plurality of mounting posts 72 formed thereon along the length of the member 66. The mounting posts 72 reside within mating apertures 74 which extend into the outer periphery of the first half shell 14 from the flat surface 68. The mounting posts 72 are secured within the mating apertures 74 by a hot staking process in which a hot pointed implement is applied to the outer end of each mounting post 72 after the mounting post 72 is seated within the aperture 74. Alternatively the mounting posts 72 can be secured by a force or interference fit or they can be designed to snap into the apertures. This is shown in detail in FIGS. 3 and 4.

The cleanout and seed sealing member 66 has a generally uniform cross-sectional shape defined in part by the bottom surface 70 and by an opposite top surface 80 which extends along the length of the member 66 adjacent the circular outer edge 36 of the seed disk 28 so as to form a small gap 82 therewith. The cross-sectional shape of the cleanout and seed sealing member 66 is tapered such that the top surface 80 thereof slopes gradually away from the outer edge 36 of the seed disk 28 with increasing distance from an axis of rotation 84 about which the seed disk 28 rotates. Accordingly, the gap 82 which is of generally uniform size along the entire length of the cleanout and seed sealing member 66 is of nominal size at an inner edge 86 of the cleanout and seed sealing member 66 and increases with increasing distance outwardly from the axis of rotation 84 to a maximum value adjacent an outer edge 88 of the cleanout and seed sealing member 66 opposite the inner edge 86.

The nominal size of the gap 82 adjacent the inner edge 86 of the cleanout and seed sealing member 66 is small enough to be outside of and below the limited range of sizes of a particular type of seed being used within seed meter 10. At the same time the nominal gap size is large enough to freely pass most seed chips, broken seeds, dirt and other debris therethrough. Thus the cleanout and seed sealing member 66 facilitates clean out of the interior of the seed chamber 44 while at the same time sealing the seeds therein. This is illustrated in FIG. 6 which illustrates both full seeds 89 and particles of debris 90 which can comprise seed chips, broken seeds or dirt.

Figure 6:
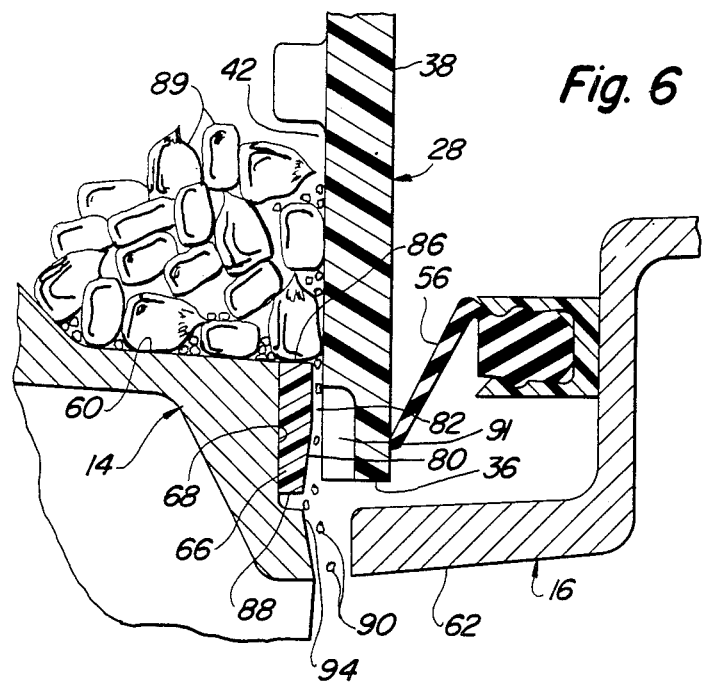
FIG. 6 is a sectional view of a portion of the seed meter of FIG. 1 illustrating the interface of the cleanout and seed sealing member and the outer edge of the seed disk and the manner in which debris is expelled from the seed chamber within the meter.
Figure 7:
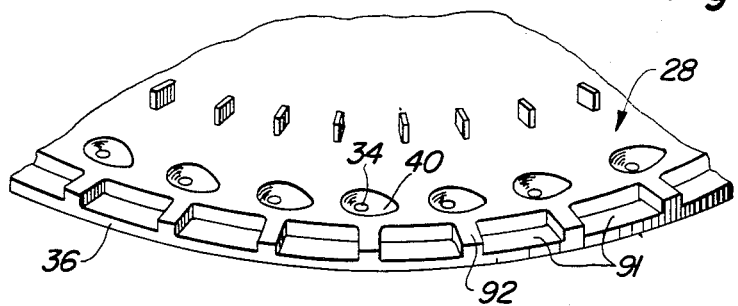
FIG. 7 is a perspective view of a portion of the outer edge of the seed disk illustrating the series of spaced-apart cavities and intervening ribs formed therein.

It will also be appreciated from FIG. 6 that the outwardly increasing size of the gap 82 provided by the sloping top surface 80 of the cleanout and seed sealing member 66 facilitates expulsion of the debris from the seed chamber 44. After the debris enters the gap 82 at the inner edge 86 of the cleanout and seed sealing member 66, the gradually increasing size of the gap 82 provides less and less resistance to the debris, causing it to pass freely and quickly through the gap 82 to the opposite outer edge 88.

The outer edge 36 of the seed disk 28 is provided with a series of spaced-apart cavities 91 therein. Each adjacent pair of the cavities 91 defines a rib 92 therebetween. The ribs 92 which are located at one side of the gap 82 perform a scraping function by scraping any buildups of debris which may occur within the gap 82. At the same time the ribs 92 agitate debris which enters the gap 82 to speed up the passage of such debris through the gap 82. This is aided by the intervening cavities 91 which receive some of the debris agitated by the ribs 92 and pass it freely and quickly out of the gap 82.

The cylindrical housing 12 has a slot 94 therein which extends around substantially the entire circumference of the generally circular outer edge 62 thereof. The slot 94 is formed by opposite edges of the first and second half shells 14 and 16 which are held in slightly spaced-apart relation by an arrangement of flanges shown in FIGS. 1, 2 and 4. As best seen in FIG. 2, the first half shell 14 has a flange 96 at the outer edge thereof opposite the hinge 18 and located just outside of the cleanout and seed sealing member 66. An additional pair of flanges 98 and 100 are located on opposite sides of the first half shell 14 between the flange 96 and the hinge 18. The second half shell 16 has a flange 102 at the outer edge thereof opposite the hinge 18 and an opposite pair of intermediate flanges 104 and 106. The radial spacing of the flanges 102, 104 and 106 from the center of the second half shell 16 is slightly greater than the radial spacing of the flanges 96, 98 and 100 from the center of the first half shell 14. When the second half shell 16 is closed over the first half shell 14, the flange 102 extends just to the outside of and in engagement with the flange 96. In like fashion the flanges 104 and 106 extend just to the outside of and in contact with the flanges 98 and 100 respectively. The various flanges 96, 98, 100, 102, 104 and 106 combine with the action of the hinge 18 to hold the edges of the first and second half shells 14 and 16 apart by a small and relatively uniform distance which forms the slot 94.

It will thus be seen that the slot 94 extends about substantially the entire circumference of the cylindrical housing 12 adjacent the cleanout and seed sealing member 66 and the outer edge 36 of the seed disk 28. The slot 94 facilitates expulsion of debris from the interior of the cylindrical housing 12 at virtually any location around the generally circular outer edge 62 of the housing 12. This is illustrated in FIG. 6.

As shown in FIG. 2 the second side 42 of the seed disk 28 has an outwardly extending spacer ring 108 formed thereon. The spacer ring 108 is centered on the seed disk 28 so as to have the center thereof at the axis of rotation 84. The spacer ring 108 which extends into contact with the hub 22 when the seed disk 28 is mounted thereon determines the spacing of the seed disk 28 from the hub 22. Accordingly, the spacer ring 108 determines the size of the gap 82 between the outer edge 36 of the seed disk 28 and the cleanout and seed sealing member 66. The seed disk 28 is normally usable only with a particular kind of seed having a predetermined limited size range. Thus the spacer ring 108 can be dimensioned to provide the desired size of the gap 82 to seal the seeds which have sizes within the limited size range within the seed chamber 44 while at the same time providing escape of debris through the gap 82. When a different type of seed is to be used in the seed meter 10, the seed disk 28 is normally changed. The new disk is provided with a spacer ring 108 having a thickness corresponding to the size of the seeds which the new seed disk is designed to be used with. Seed disks 28 designed for use with larger seeds have spacer rings 108 which are relatively wide so as to position the second side 42 of the seed disk 28 a greater distance from the hub 22 to provide the gap 82 with a larger size. When smaller seeds are to be metered, the gap 82 must be reduced in size to seal the seeds within the seed chamber 44 and prevent the escape therefrom. This is accomplished by providing the seed disks 28 which are used with the smaller seeds with a narrower spacer ring 108 which positions the second side 42 of the seed disk 28 closer to the hub 22.

While the invention has been particularly shown and described with reference to a preferred embodiment thereof, it will be understood by those skilled in the art that various changes in form and details may be made therein without departing from the spirit and scope of the invention.

What is claimed is:

1. In a seed meter, the combination comprising:
   a housing;
   a seed disk rotatably mounted about an axis of rotation within the housing and having a generally circular outer edge;
   the housing having a generally circular outer periphery and an opening therein adjacent at least a portion of the outer edge of the seed disk and defining a seed discharge area at a side of the seed disk; and
   a cleanout and seed sealing member mounted within the housing adjacent the opening in the housing and the outer edge of the seed disk, the member extending around substantially the entire outer periphery of the housing except at the seed discharge area and forming a gap with the outer edge of the seed disk, the gap being smaller than each of a plurality of seeds to be contained with the housing and at the same time larger than certain debris which may occur within the housing so as to pass the debris therethrough.

2. The invention set forth in claim 1, wherein the outer edge of the seed disk has a plurality of cavities therein adjacent the cleanout and seed sealing member, the cavities being spaced-apart along the outer edge and separated by ribs in the outer edge.

3. The invention set forth in claim 1, wherein the opening in the housing comprises a plurality of openings extending around the housing adjacent substantially the entire outer edge of the seed disk.

4. In a seed meter, the combination comprising:
   a housing;
   a seed disk rotatably mounted about an axis of rotation within the housing and having a generally circular outer edge;
   the housing having an opening therein adjacent at least a portion of the outer edge of the seed disk; and
   a cleanout and seed sealing member mounted within the housing adjacent the opening in the housing and the outer edge of the seed disk, the member forming a gap with the outer edge of the seed disk, the gap being smaller than each of a plurality of seeds to be contained within the housing and at the same time larger than certain debris which may occur within the housing so as to pass the debris therethrough,
   the cleanout and seed sealing member having a surface adjacent the outer edge of the seed disk which slopes away from the disk with increasing distance from the axis of rotation of the seed disk.

5. In a seed meter, the combination comprising:
   a housing;
   a seed disk rotatably mounted about an axis of rotation within the housing and having a generally circular outer edge;
   the housing having an opening therein adjacent at least a portion of the outer edge of the seed disk;
   a cleanout and seed sealing member mounted within the housing adjacent the opening in the housing and the outer edge of the seed disk, the member forming a gap with the outer edge of the seed disk, the gap being smaller than each of a plurality of seeds to be contained within the housing and at the same time larger than certain debris which may occur within the housing so as to pass the debris therethrough;
   a hub disposed within the housing and having the seed disk rotatably mounted thereon; and
   a spacer disposed on a side of the seed disk, the spacer extending into contact with the hub and combining with the cleanout and seed sealing member to define the size of the gap between the cleanout and seed sealing member and the outer edge of the seed disk.

6. The invention set forth in claim 5, wherein the spacer comprises a ring extending outwardly from the side of the seed disk and having a center at the axis of rotation.

7. In a device for metering particles having a limited size range, the combination comprising:
   a generally cylindrical housing having a circular outer edge;
   a disk mounted within the housing for rotation about a central axis thereof and having a circular outer edge disposed within and adjacent the circular outer edge of the housing;
   the housing being adapted to contain a plurality of particles having a limited size range therein adjacent a portion of the circular outer edge of the disk; and an elongated, curved member of generally uniform cross-sectional shape mounted within the housing adjacent a portion of the outer edge of the disk, the cross-sectional shape of the member being tapered in a radial direction relative to the central axis of the disk to provide a generally uniform gap between the member and the edge of the disk along the length of the member, the generally uniform gap increasing with increasing distance from the central axis of the disk.

8. The invention set forth in claim 7, wherein the generally uniform gap between the member and the outer edge of the disk at a location adjacent the inner edge of the member is smaller than the limited size range, whereby particles of the limited size range contained within the housing cannot escape through the generally uniform gap but most pieces of such particles and dirt and debris of relatively small size can escape through the generally uniform gap.

9. The invention set forth in claim 8, further including an elongated cleanout and seed sealing member of generally uniform cross-sectional shape mounted within the housing adjacent the outer edge of the seed disk, the member being spaced-apart from the outer edge of the seed disk and defining the opening in the generally enclosed seed chamber therebetween.

10. The invention set forth in claim 7, further including a slot in the circular outer edge of the housing adjacent the member and the circular outer edge of the disk, the slot extending around substantially the entire circumference of the circular outer edge, and wherein the member extends around the housing adjacent a substantial portion of the circumference of the circular outer edge of the disk.

11. In a seed meter, the combination comprising:
a housing having a generally enclosed seed chamber therein;
a seed disk rotatably mounted about an axis of rotation within the housing and having a generally circular outer edge having a plurality of cavities therein, the cavities being spaced-apart along the outer edge and separated by ribs in the outer edge;
the housing having an opening in the generally enclosed seed chamber therein extending along a portion of the outer edge of the seed disk, the size of the opening being selected to prevent seeds contained within the generally enclosed seed chamber from passing therethrough, the housing having a second opening therein in an outer surface thereof, the second opening being outside of the opening in the generally enclosed seed chamber and lying adjacent at least a portion of the outer edge of the seed disk; and
a cleanout and seed sealing member mounted within the housing at the opening in the generally enclosed seed chamber and defining the size of the opening.

12. In a seed meter, the combination comprising:
a housing having a generally enclosed seed chamber therein;
a hub disposed within the housing and rotatable about an axis of rotation; and
a seed disk mounted on the hub within the housing and having a generally circular outer edge and a spacer on a side thereof adjacent the hub, the spacer extending from the side of the seed disk into contact with the hub;
the housing having an opening in the generally enclosed seed chamber therein extending along a portion of the outer edge of the seed disk, the size of the opening being determined by the spacer on the side of the seed disk and being selected to prevent seeds contained within the generally enclosed seed chamber from passing therethrough.

13. The invention set forth in claim 12, wherein the housing has a second opening therein in an outer surface thereof, the second opening being outside of the opening in the generally enclosed seed chamber and lying adjacent at least a portion of the outer edge of the seed disk, and wherein the spacer comprises a ring extending outwardly from the side of the seed disk and having a center at the axis of rotation.

* * * * *